US008314944B2

(12) United States Patent
Kushida

(10) Patent No.: US 8,314,944 B2
(45) Date of Patent: Nov. 20, 2012

(54) IMAGE FORMING DEVICE, METHOD, AND COMPUTER READABLE MEDIUM TO AVOID UNNECESSARY IMAGE FORMING POSITION CORRECTION

(75) Inventor: Tsuyoshi Kushida, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 827 days.

(21) Appl. No.: 12/277,928

(22) Filed: Nov. 25, 2008

(65) Prior Publication Data

US 2009/0141298 A1 Jun. 4, 2009

(30) Foreign Application Priority Data

Nov. 30, 2007 (JP) ................................ 2007-311140

(51) Int. Cl.
*G06K 15/00* (2006.01)
*G06K 9/36* (2006.01)

(52) U.S. Cl. ..................... 358/1.12; 358/1.13; 358/1.14; 358/1.15; 358/3.26; 358/3.28; 358/1.9; 358/1.2; 358/1.1; 358/451; 358/473; 358/474; 382/103; 382/112; 382/163; 382/164; 382/165; 382/175; 382/176; 382/177; 382/178; 382/179; 382/266; 382/274; 382/278; 382/287; 382/286; 347/19; 347/20; 347/23; 347/29; 347/49; 347/86; 347/104; 347/107; 347/108; 347/109; 347/116; 347/138; 347/153

(58) Field of Classification Search ........................ None
See application file for complete search history.

(56) References Cited

U.S. PATENT DOCUMENTS 4,937,664 A * 6/1990 Chiku et al. .................. 358/526
5,168,307 A * 12/1992 Masuda et al. .................. 355/57
(Continued)

FOREIGN PATENT DOCUMENTS

EP 0919882 A1 6/1999
(Continued)

OTHER PUBLICATIONS

JP Office Action dtd Oct. 20, 2009, JP App. 2007-311140.
(Continued)

*Primary Examiner* — Steven Kau
(74) *Attorney, Agent, or Firm* — Banner & Witcoff, Ltd.

(57) ABSTRACT

An image forming device includes a main body casing, a cover configured to be openable and closable with respect to the main body casing, a sensing unit configured to sense an opening-closing operation of the cover, a forming unit configured to form an image on a sheet, a detecting unit configured to perform a detecting operation to detect a deviation of an image forming position of the image to be formed by the forming unit, an accepting unit configured to accept a print request, and a control unit configured to control the detecting unit to perform the detecting operation in response to the print request being accepted when the sensing unit senses an opening-closing operation of the cover after execution of a previous detecting operation, and thereafter to control the forming unit to form the image in the image forming position corrected to cancel the deviation detected in the detecting operation.

22 Claims, 15 Drawing Sheets

U.S. PATENT DOCUMENTS

| | | | | |
|---|---|---|---|---|
| 6,070,041 | A | 5/2000 | Nakayasu et al. | |
| 6,084,607 | A * | 7/2000 | Matsuda | 347/19 |
| 6,292,267 | B1 * | 9/2001 | Mori et al. | 358/1.15 |
| 6,429,886 | B2 | 8/2002 | Ohki | |
| 6,987,582 | B1 * | 1/2006 | Atsumi | 358/1.6 |
| 7,162,171 | B2 * | 1/2007 | Sugiyama | 399/49 |

FOREIGN PATENT DOCUMENTS

| | | | |
|---|---|---|---|
| JP | 11-095628 | | 4/1999 |
| JP | 2000-155453 | | 6/2000 |
| JP | 2001-272836 | | 10/2001 |
| JP | 2001-343872 | A | 12/2001 |
| JP | 2002-148890 | A | 5/2002 |
| JP | 2003-270894 | A | 9/2003 |
| JP | 2004-157413 | | 6/2004 |
| JP | 2004-157415 | | 6/2004 |
| JP | 2005-077453 | | 3/2005 |
| JP | 2007-065377 | A | 3/2007 |

OTHER PUBLICATIONS

Extended EP Search Report dtd May 8, 2009, EP Appln. 08020116.3.

* cited by examiner

IMAGE FORMING DEVICE, METHOD, AND COMPUTER READABLE MEDIUM TO AVOID UNNECESSARY IMAGE FORMING POSITION CORRECTION

CROSS-REFERENCE TO RELATED APPLICATION

This application claims priority under 35 U.S.C. §119 from Japanese Patent Application No. 2007-311140 filed on Nov. 30, 2007. The entire subject matter of the application is incorporated herein by reference.

BACKGROUND

1. Technical Field

The following description relates to one or more techniques to avoid unnecessary correction for canceling deviations of image forming positions in an image forming device.

2. Related Art

An image forming device such as a color electrophotographic printer has been known, which includes a plurality of image forming units aligned along a sheet carrying belt such that toner images of respective different colors are sequentially transferred by the image forming units onto a sheet being conveyed on the sheet carrying belt. In such an image forming device, when positional deviations are caused among the respective toner images transferred onto the sheet by the image forming units, a formed image becomes a low-quality one.

In order to secure the quality of the image, a technique referred to as registration for correcting the positional deviations among the toner images transferred onto the sheet has been employed. According to the correction technique, a predetermined pattern is formed on a surface of the sheet carrying belt by each image forming unit, and the positional deviations between different color toner images are determined by detecting the pattern using an optical sensor. Then, based on the positional deviations determined, the image forming position by each image forming unit is corrected.

Meanwhile, in the image forming device, the accuracies of the image forming positions are likely to vary due to operations of opening and closing a cover, and therefore it may lead to the deviations of the image forming positions. For example, Japanese Patent Provisional Publication No. HEI11-95628 discloses an image forming device configured to detect deviations of image forming positions in response to detecting a cover closing operation, determine correction values for canceling the deviations, and perform a printing operation on the basis of the determined correction values in response to a print request.

SUMMARY

However, the aforementioned image forming device has a problem that the positional deviation detection is performed each time the cover is opened and closed. Specifically, according to the aforementioned image forming device, each time the cover opening-closing operation is repeatedly carried out without being followed by a printing operation, the positional deviation correction is unnecessarily executed. It causes problems such as deterioration of components of the image forming device and wasteful consumption of coloring agent. It is noted that, even in a single-color printing operation (e.g., a monochrome printing operation), it may be required to correct deviations of image forming positions. For instance, when characters are printed on a ledger sheet, it is required to print characters accurately in each section on the ledger sheet. Accordingly, not only in the color printing operation but also in the single-color printing operation, the above-raised problems may be caused.

Aspects of the present invention are advantageous to provide one or more improved image forming devices, methods, and computer readable media that make it possible to avoid unnecessary correction for canceling deviations of image forming positions.

According to aspects of the present invention, an image forming device is provided, which includes a main body casing, a cover configured to be openable and closable with respect to the main body casing, a sensing unit configured to sense an opening-closing operation of the cover, a forming unit configured to form an image on a sheet, a detecting unit configured to perform a detecting operation to detect a deviation of an image forming position of the image to be formed by the forming unit, an accepting unit configured to accept a print request, and a control unit configured to control the detecting unit to perform the detecting operation in response to the print request being accepted through the accepting unit when the sensing unit senses an opening-closing operation of the cover after execution of a previous detecting operation, and thereafter to control the forming unit to perform a printing operation to form the image in the image forming position corrected to cancel the deviation detected in the detecting operation.

In some aspects of the present invention, the detecting operation is not necessarily performed each time the cover is opened and closed. Even though the cover is opened and closed after the previous detecting operation, the detecting operation is not executed as far as the print request is not issued. In other words, the detecting operation is executed in response to the print request being issued, and thereafter the image is formed in the image forming position on the sheet that is corrected to cancel the deviation detected in the detecting operation. Therefore, even though the cover is repeatedly opened and closed without any print request issued, it is possible to prevent positional deviation correction from being unnecessarily performed.

According to aspects of the present invention, further provided is a method for forming an image on a sheet with an image forming device that includes a main body casing and a cover configured to be openable and closable with respect to the main body casing. The method includes the steps of determining whether the cover is opened and closed, accepting a print request, performing a detecting operation to detect a deviation of an image forming position of the image to be formed by the image forming device, in response to the print request being accepted, when it is determined that the cover is opened and closed after execution of a previous detecting operation, forming the image in the image forming position corrected to cancel the deviation of the image forming position detected in the detecting operation.

With the method adopted as above, the same effect as the aforementioned image forming device can be provided. Specifically, the detecting operation is executed in response to the print request being issued, and thereafter the image is formed in the image forming position on the sheet that is corrected to cancel the deviation detected in the detecting operation. Therefore, even though the cover is repeatedly opened and closed without any print request issued, it is possible to prevent positional deviation correction from being unnecessarily performed.

According to aspects of the present invention, further provided is a computer readable medium having computer readable instructions stored thereon to be executed by an image forming device that includes a main body casing and a cover configured to be openable and closable with respect to the main body casing. The instructions causes the image forming device to perform the steps of determining whether the cover is opened and closed, accepting a print request, performing a detecting operation to detect a deviation of an image forming position of an image to be formed by the image forming device, in response to the print request being accepted, when it is determined that the cover is opened and closed after execution of a previous detecting operation, forming the image in the image forming position corrected to cancel the deviation of the image forming position detected in the detecting operation.

With the computer readable medium adopted as above, the same effect as the aforementioned image forming device and method can be provided.

BRIEF DESCRIPTION OF THE ACCOMPANYING DRAWINGS

Figure 5:
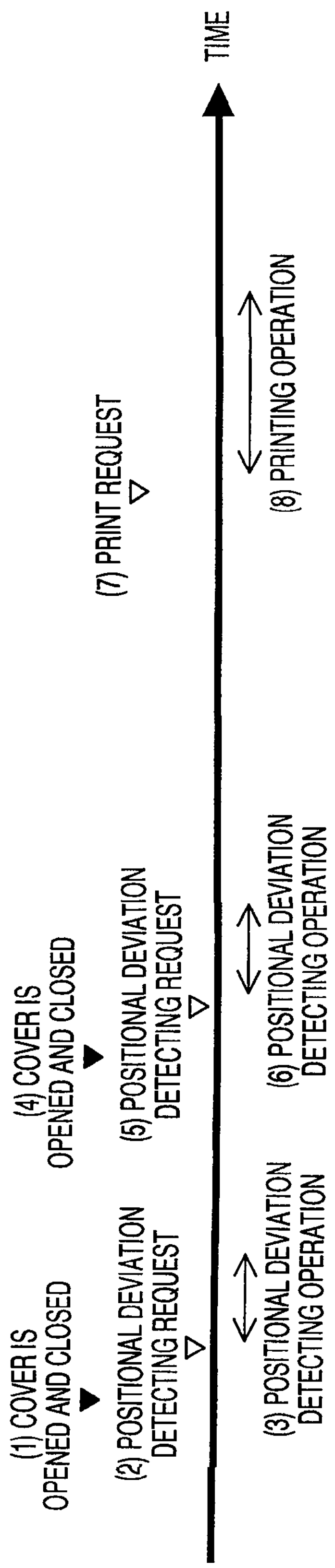

FIG. 5 exemplifies a time chart showing a time relationship among events such as cover opening-closing operations, positional deviation detecting operations, and a print request in a comparative example.

Figure 6:
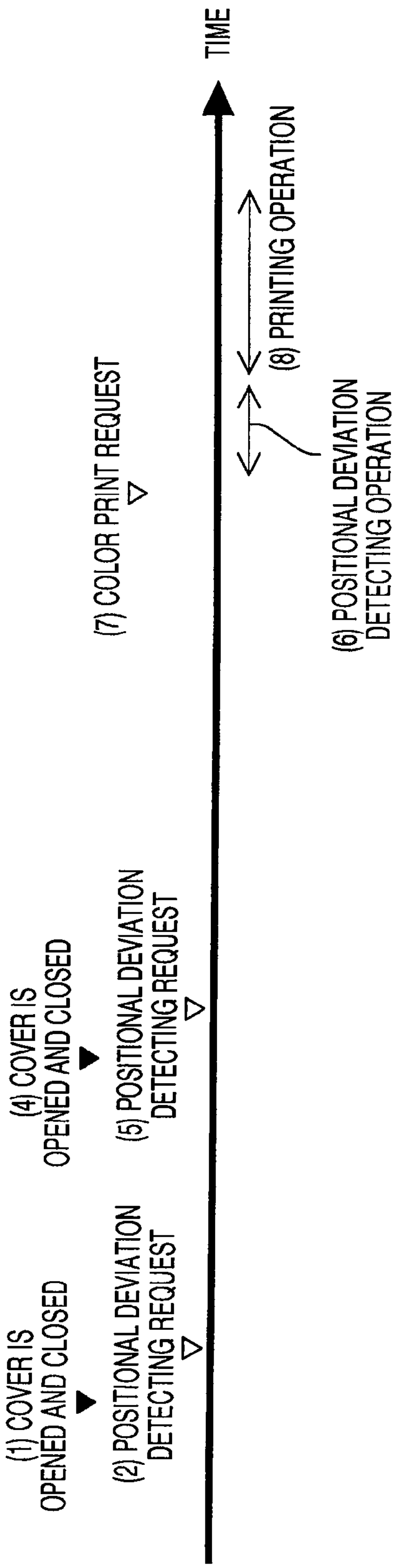
Figure 7:
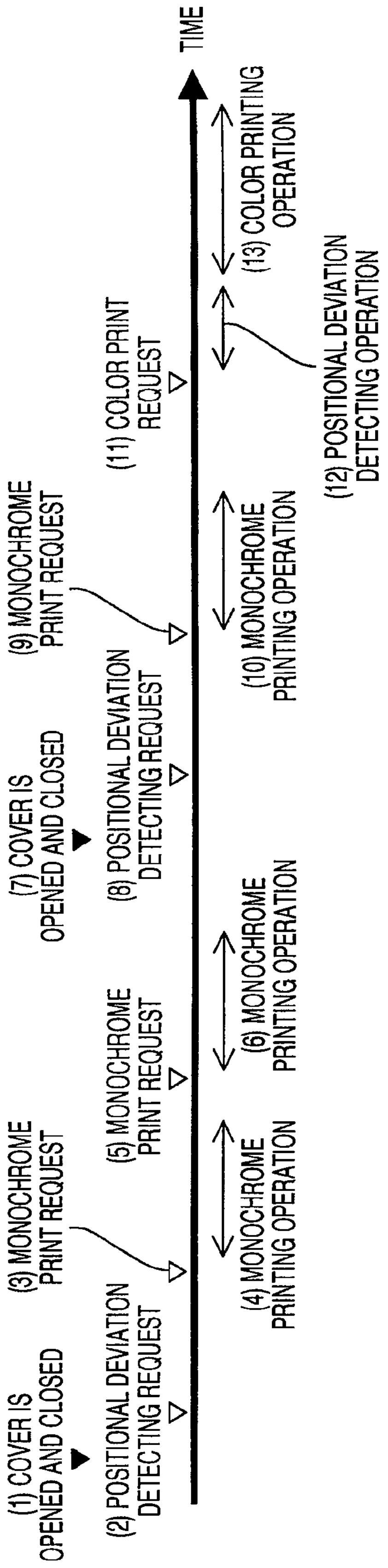

FIGS. 6 and 7 exemplify time charts showing time relationships among events such as cover opening-closing operations, a positional deviation detecting operation, and print requests in the first embodiment according to one or more aspects of the present invention.

Figure 8:
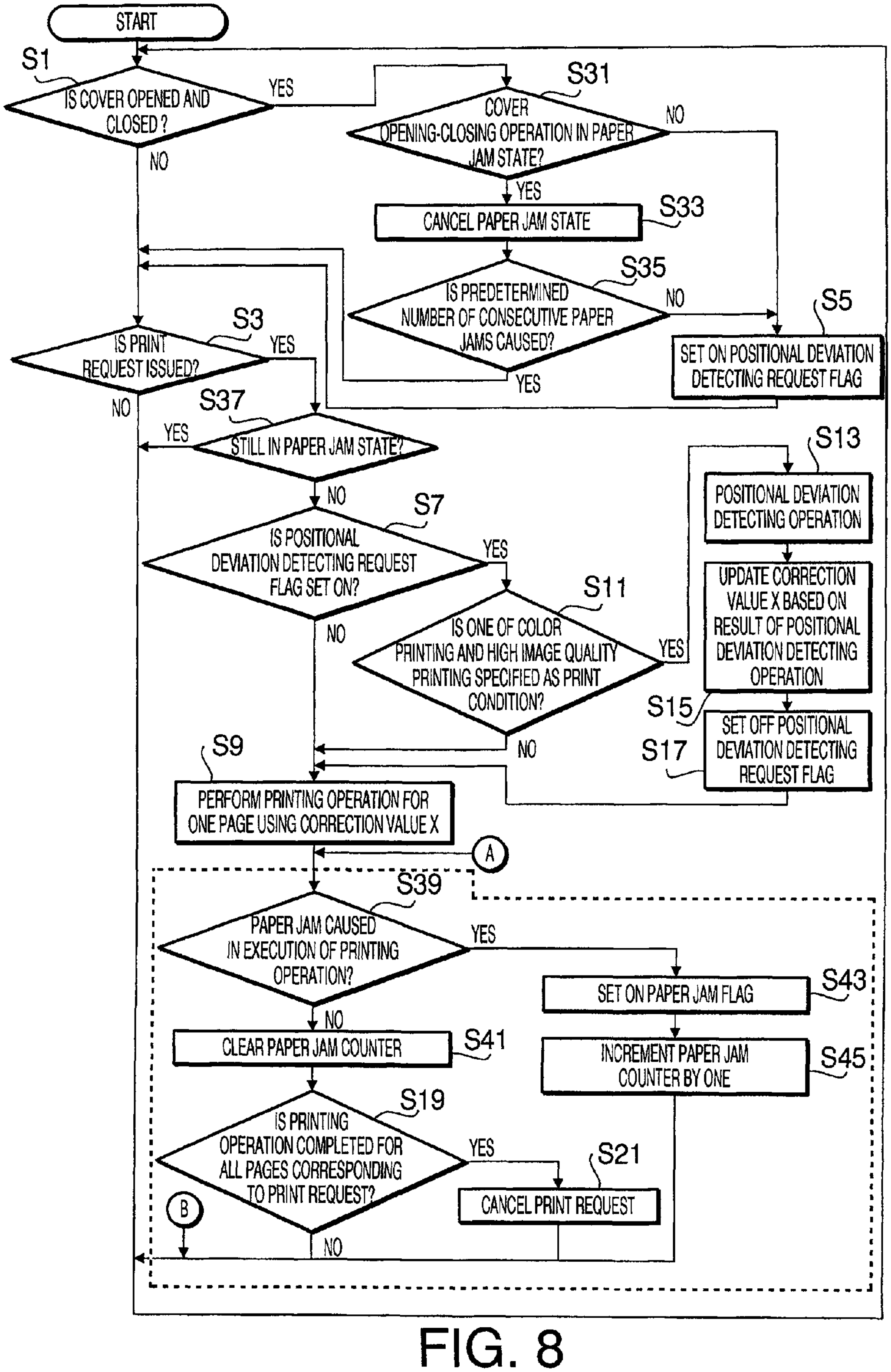

FIG. 8 is a flowchart showing a procedure of a control process for printing and positional deviation correction in a second embodiment according to one or more aspects of the present invention.

Figure 9:
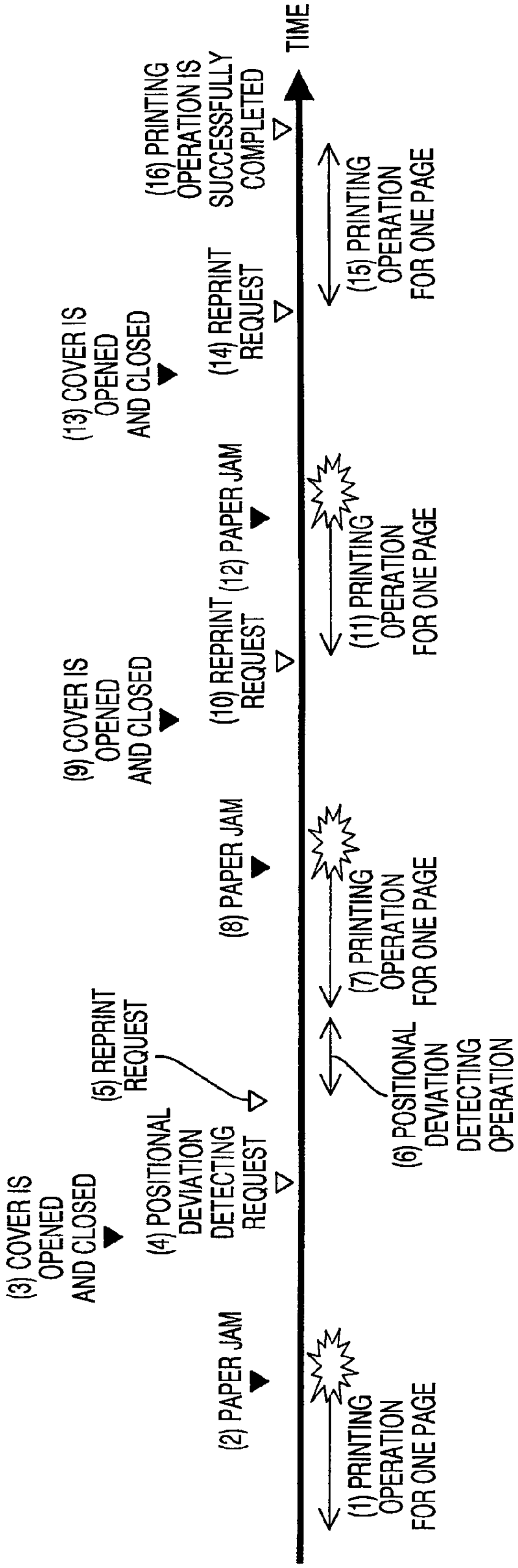

FIG. 9 exemplifies a time chart showing a time relationship among events such as cover opening-closing operations, a positional deviation detecting operation, and print requests in the second embodiment according to one or more aspects of the present invention.

Figure 10:
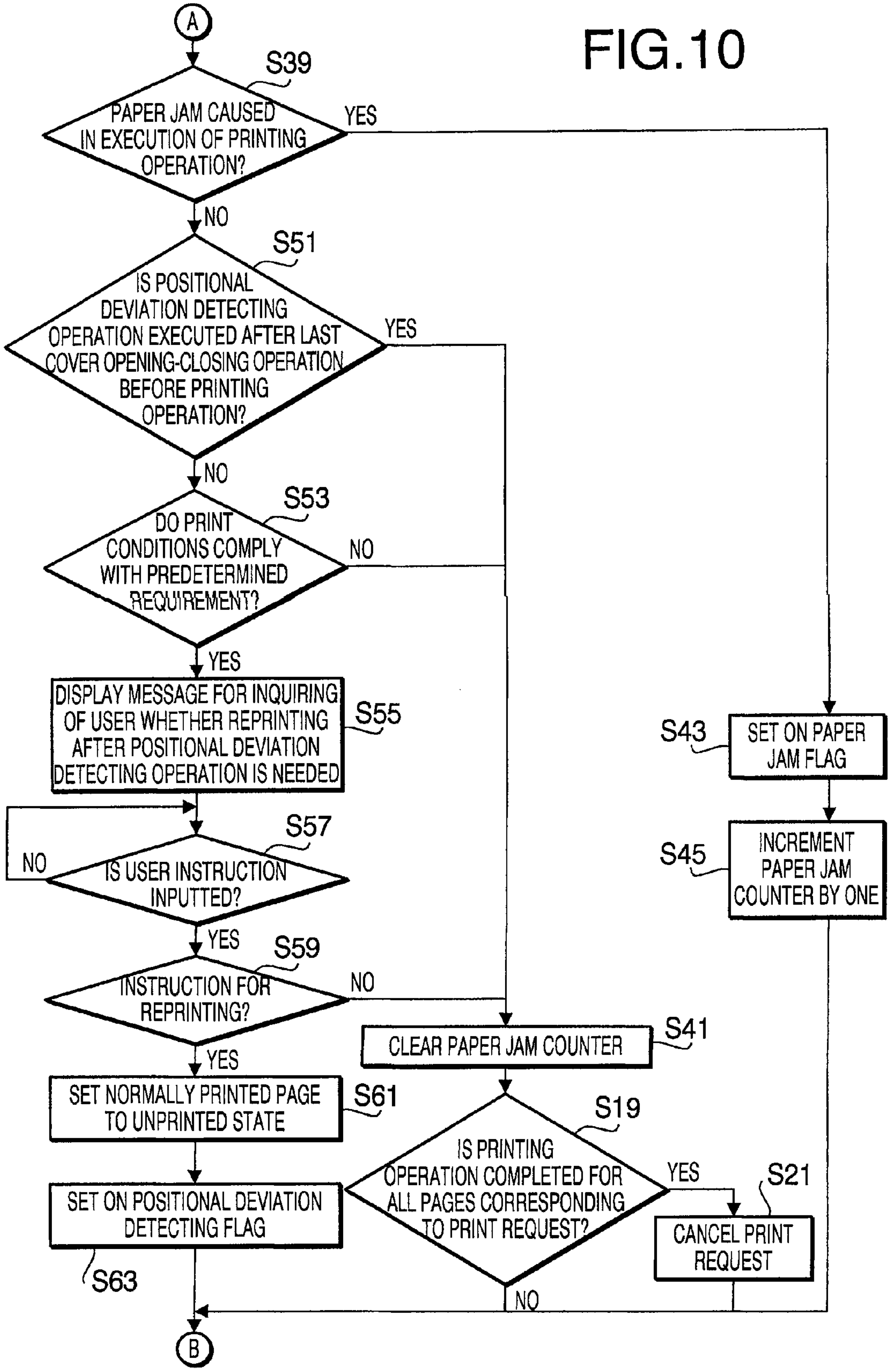

FIG. 10 is a flowchart showing a procedure of a control process for printing and positional deviation correction in a third embodiment according to one or more aspects of the present invention.

Figure 11:
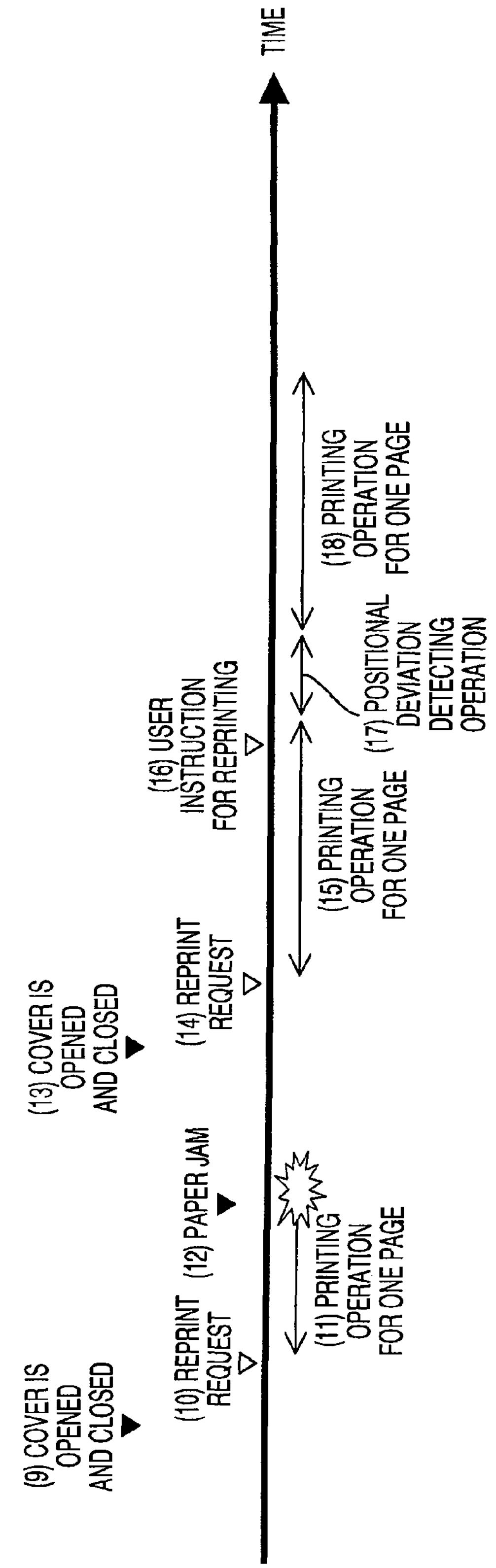

FIG. 11 exemplifies a time chart showing a time relationship among events such as cover opening-closing operations, a positional deviation detecting operation, and print requests in the third embodiment according to one or more aspects of the present invention.

Figure 12:
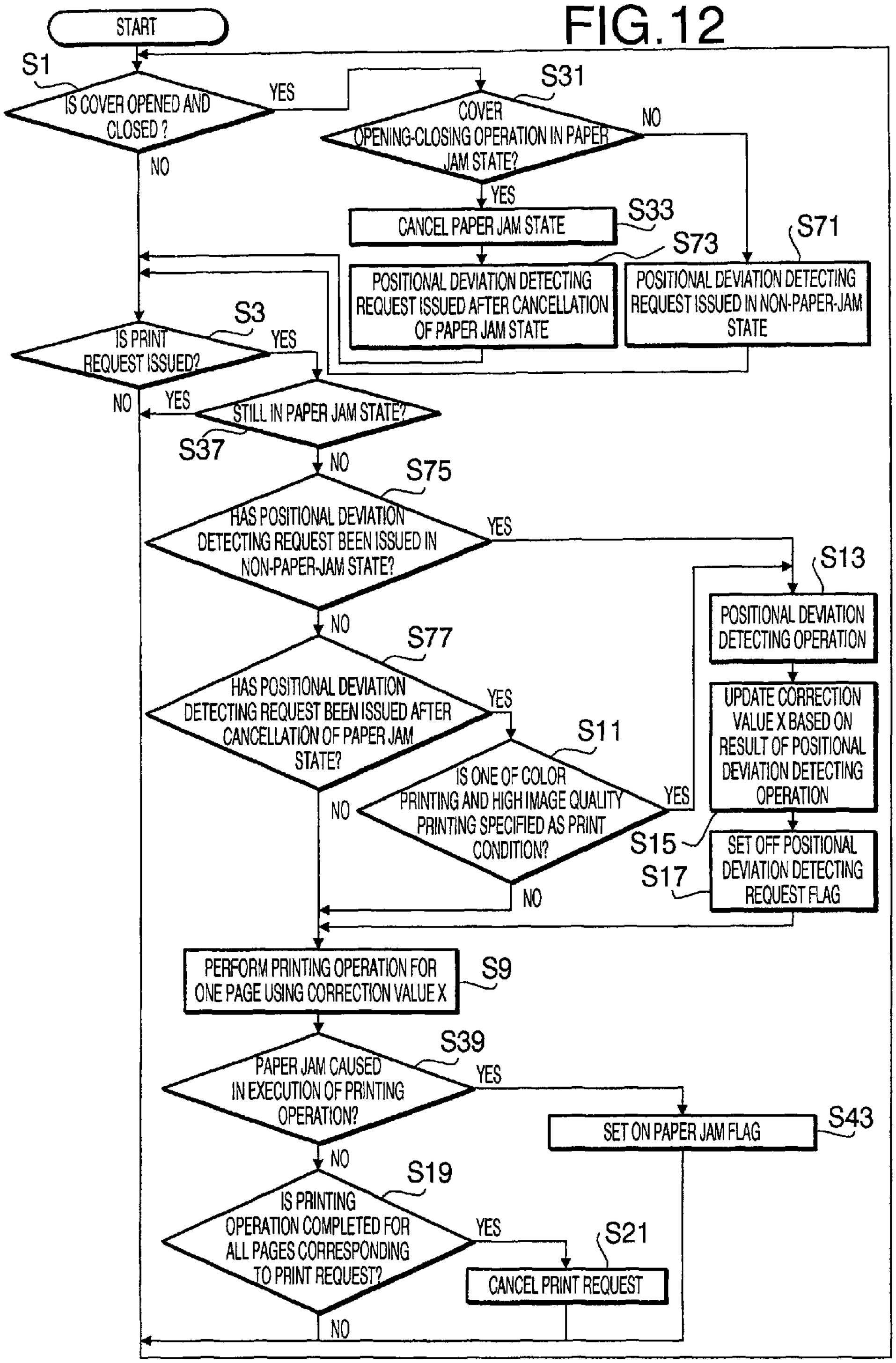

FIG. 12 is a flowchart showing a procedure of a control process for printing and positional deviation correction in a fourth embodiment according to one or more aspects of the present invention.

Figure 13:
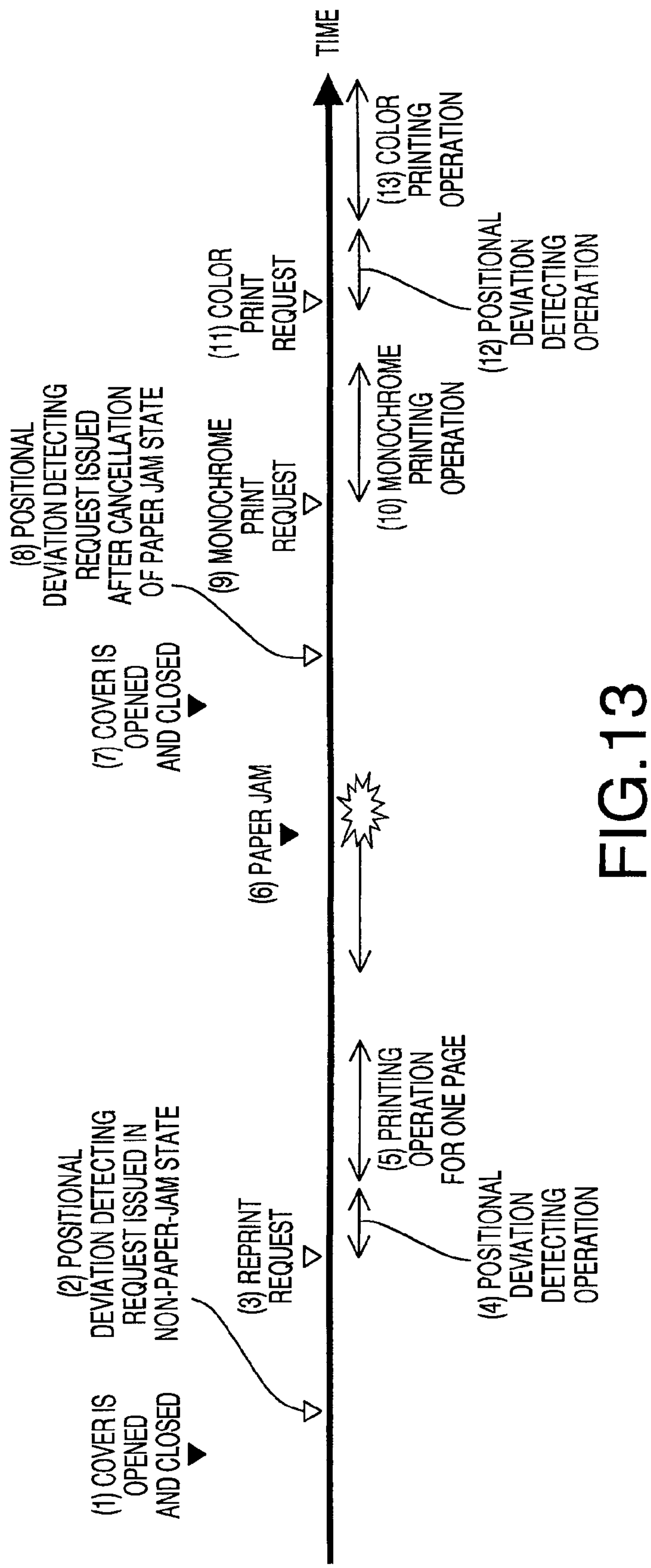

FIG. 13 exemplifies a time chart showing a time relationship among events such as cover opening-closing operations, positional deviation detecting operations, and print requests in the fourth embodiment according to one or more aspects of the present invention.

Figure 14:
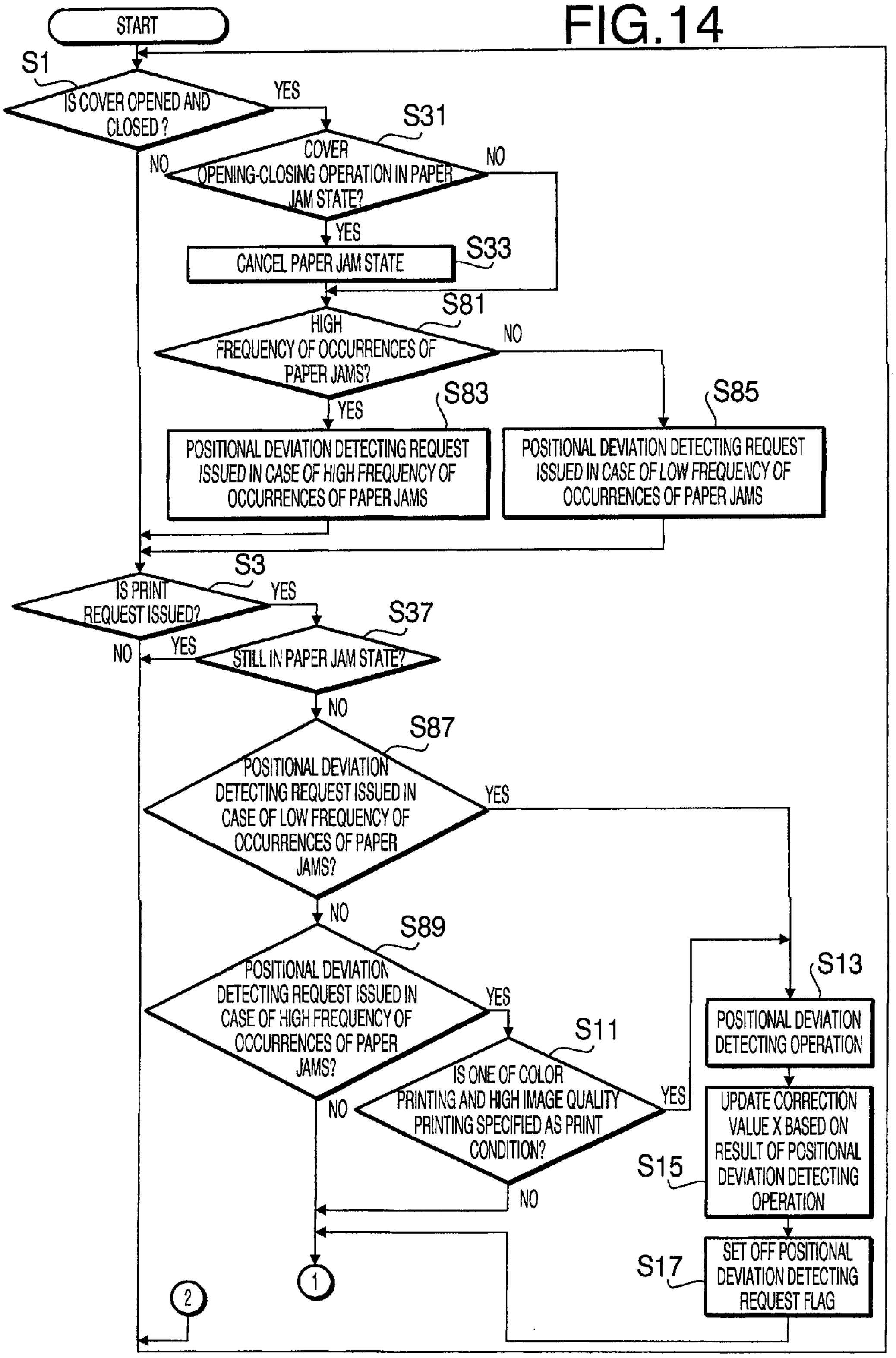
Figure 15:
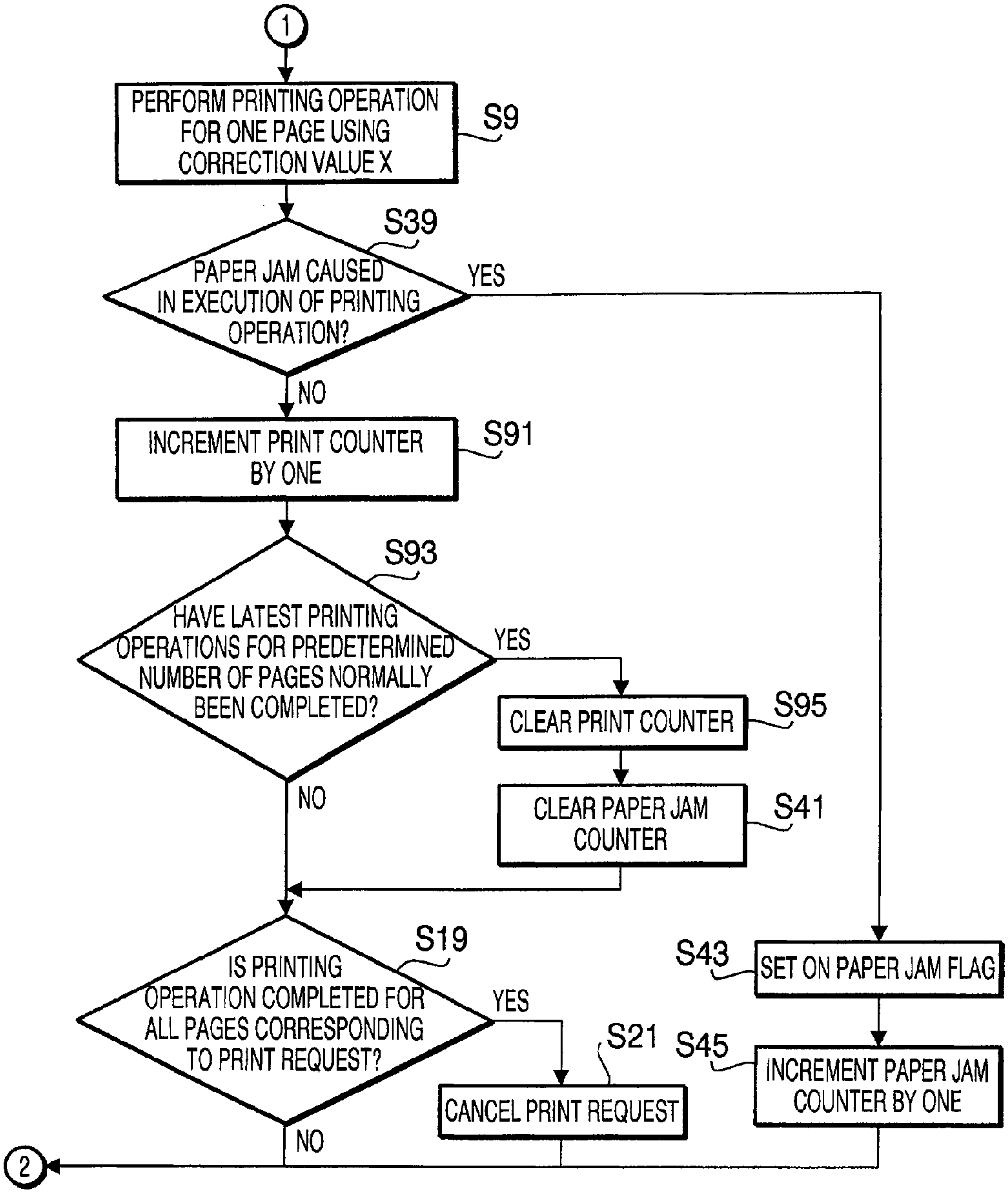

FIGS. 14 and 15 are flowcharts showing a procedure of a control process for printing and positional deviation correction in a fifth embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, embodiments according to aspects of the present invention will be described with reference to the accompany drawings.

<First Embodiment>

A first embodiment will be explained referring to FIGS. 1 to 7.

(Overall Configuration of Printer)

Figure 1:
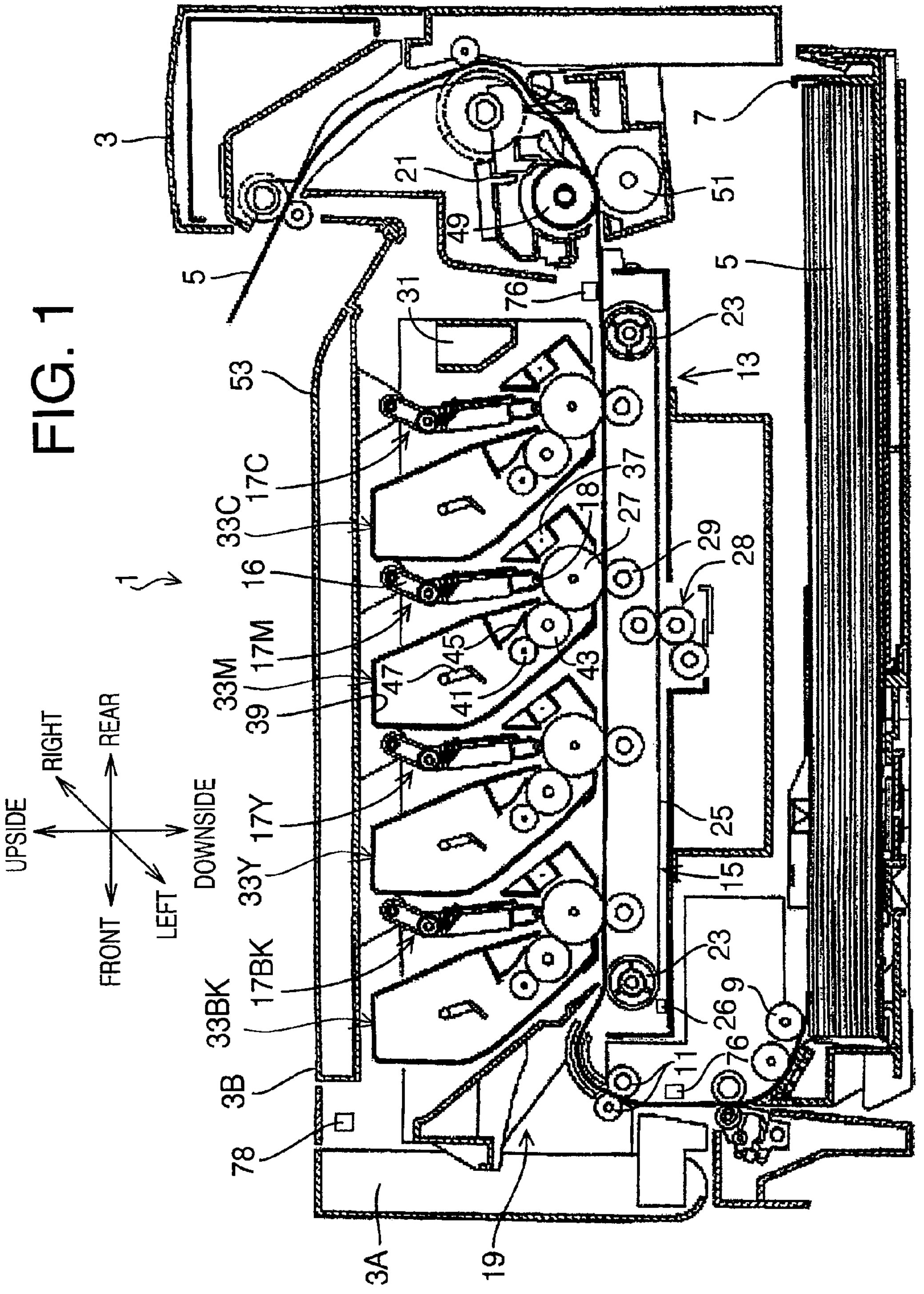
FIG. 1 is a cross-sectional side view schematically showing a configuration of a printer in a first embodiment according to one or more aspects of the present invention.

FIG. 1 is a cross-sectional side view schematically showing a configuration of a printer 1 in the first embodiment according to aspects of the present invention. It is noted that the following description will be given under an assumption that a left side of FIG. 1 is defined as a front side of the printer 1. In addition, the printer 1 is a color printer configured to form a color image with coloring agents of four colors (black BK, yellow Y, magenta M, and cyan C). Hereinafter, when each constituent component of the printer 1 is required to be distinguished by the color, the constituent component is represented by a reference number with a suffix denoting a corresponding color such as "BK," "Y," "M," and "C" added to an end thereof.

The printer 1 is provided with a main body casing 3. At a bottom of the main body casing 3, a sheet feed tray 7 is provided, which is configured to be loaded with one or more sheets 5 as recording media. On a front side of the main body casing 3, a front cover 3A is provided to be openable and closable around a lower end thereof. In addition, an upper cover 3B is provided on the main body casing 3 in a manner openable and closable around a rear end thereof.

On an upper front side of the sheet feed tray 7, a sheet feed roller 9 is provided. Along with rotation of the sheet feed roller 9, a top sheet 5 in the sheet feed tray 7 is conveyed to a registration roller 11. After skew correction of the sheet 5, the registration roller 11 carries the sheet 5 onto a belt unit 15 of an image forming unit 13.

The image forming unit 13 includes the belt unit 15, an exposure unit 17, a process unit 19, and a fixing unit 21. The belt unit 15 is configured with a belt 25 made of polycarbonate being strained around a pair of front and rear belt supporting rollers 23. When the rear belt supporting roller 23 is driven and rotated, the belt 25 is revolved in a clockwise direction, and the sheet 5 on the belt 25 is conveyed backward. Further, inside the belt 25, transfer rollers 29 are provided to face respective corresponding photoconductive drums 27 of the process unit 19 via the belt 25.

Additionally, a pair of pattern detecting sensors 26, configured to detect a pattern formed on the belt 25, is provided to face a lower side surface of the belt 25. The pattern detecting sensors 26 are configured to emit light onto the surface of the belt 25, receive the light reflected by the surface of the belt 25 with a phototransistor, and output a signal of a level corresponding to an intensity of the received light. Further, under the belt unit 15, a cleaning unit 28 is provided, which is configured to collect toner and/or paper dusts adhered to the surface of the belt 25.

The exposure unit 17 is provided with four LED units 17BK, 17Y, 17M, and 17C. Each of the LED units 17BK, 17Y, 17M, and 17C includes an arm 16 of which an upper end is supported as suspended from a lower face of the upper cover 3B, and an LED head 18 provided at a lower end of the arm 16. The LED head 18 is configured with a plurality of light emitting elements, each of which is composed of an LED, aligned in a right-to-left direction. A below-mentioned CPU 61 controls each of the light emitting elements to emit light based on image data of an image to be formed. Thereby, a surface of the photoconductive drum 27 is illuminated with and exposed to the light emitted by each of the light emitting elements.

The process unit 19 includes a frame 31 and development cartridges 33 (33BK, 33Y, 33M, and 33C) corresponding to the respective four colors. At a lower side of each development cartridge 33, the photoconductive drum 27, of which a surface is covered with a photoconductive layer having a property to be positively charged, and a scorotron type charger 37 are provided.

It is noted that, by opening the upper cover 3B, it is possible to exchange the development cartridge 33 for a new one. Further, by detaching the development cartridge 33 or opening the front cover 3A, it is possible to remove a jammed sheet.

Each of the development cartridges 33 includes, at an upper side in a box-shaped casing, a toner container 39 configured to store therein toner as developer of each color. Further, each of the development cartridge 33 includes, at a lower side of the toner container 39, a supply roller 41, a development roller 43, a layer thickness controlling blade 45, and an agitator 47. Some toner in the toner container 39 is supplied to the development roller 43 through rotation of the supply roller 41 and positively charged through friction between the supply roller 41 and the development roller 43. Further, the toner supplied onto the development roller 43 is introduced into between the layer thickness controlling blade 45 and the development roller 43 along with rotation of the development roller 43. Then, the toner is sufficiently charged due to friction here and held on the development roller 43 as a thin layer with a constant thickness.

In an image forming operation, the photoconductive drum 27 is rotated, and thereby the surface of the photoconductive drum 27 is evenly and positively charged by the charger 37. Then, the positively charged surface is exposed through fast scanning with the laser beam emitted by the exposure unit 17, and an electrostatic latent image corresponding to the image to be formed on the sheet 5 is formed on the surface of the photoconductive drum 27.

Subsequently, when contacting the photoconductive drum 27 through the rotation of the development roller 43, the positively charged toner held on the development roller 43 is supplied to the electrostatic latent image formed on the surface of the photoconductive drum 27. Thereby, the photoconductive drum 27 holds thereon a toner image formed with the toner adhered only to the exposed portions on the surface thereof, and thus the electrostatic latent image on the photoconductive drum 27 is visualized.

After that, the toner image held on the surface of each photoconductive drum 27 is sequentially transferred onto the sheet 5 by a negative transfer voltage applied to the transfer roller 29 while the sheet 5 conveyed on the belt 25 passes through a transfer position between the photoconductive drum 27 and the transfer roller 29. Then, the sheet 5 with the toner image thus transferred thereon is conveyed to the fixing unit 21.

The fixing unit 21 includes a heating roller 49 having a heating source and a pressing roller 51 configured to press the sheet 5 against the heating roller 49. The fixing unit 21 is configured to thermally fix the toner image transferred onto the sheet 5. Then, the sheet 5 with the toner image fixed thereon is conveyed upward and discharged onto a catch tray 53 provided on an upper face of the main body casing 3.

(Electrical Configuration of Printer)

Figure 2:
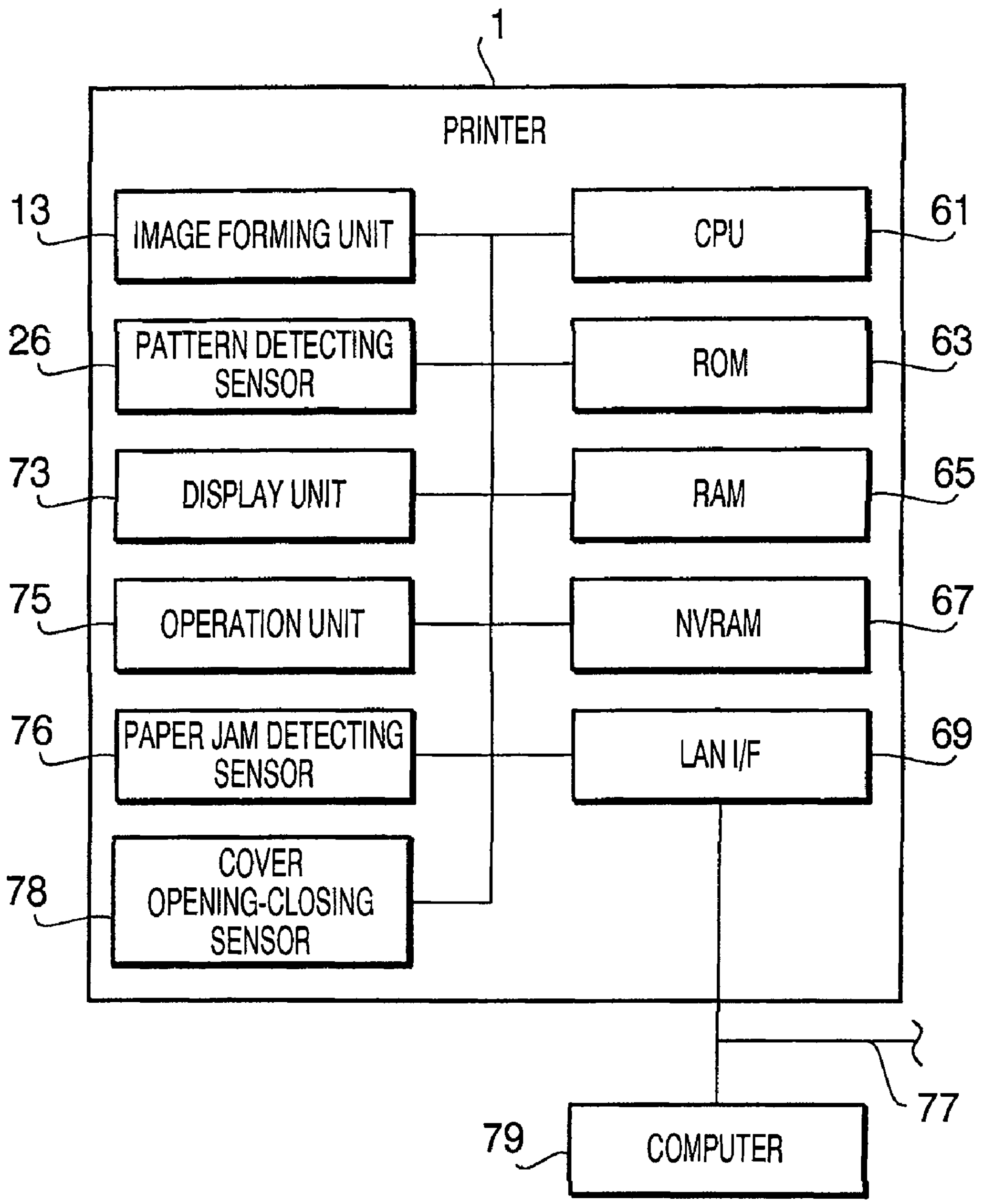
FIG. 2 is a block diagram schematically showing an electrical configuration of the printer in the first embodiment according to one or more aspects of the present invention.

FIG. 2 is a block diagram showing an electrical configuration of the printer 1. As shown in FIG. 2, the printer 1 includes a CPU 61, a ROM 63, a RAM 65, an NVRAM 67, and a network interface 69, which are connected with the image forming unit 13, the pattern detecting sensors 26, a display unit 73, an operation unit 75, a paper jam detecting sensor 76, and a cover opening-closing detecting sensor 78.

The ROM 63 stores thereon programs for executing various operations of the printer 1 such as a below-mentioned control process for printing and positional deviation correction. The CPU 61 controls each element included in the printer 1 in accordance with a program read out from the ROM 63 while saving processing results onto the RAM 65 or the NVRAM 67 (hereinafter referred to as the RAM 65 or the like). The network interface 69 is linked with an external computer 79 via a communication line 77 to attain mutual data communication therebetween.

The display unit 73 is provided with a liquid crystal display (LCD) and lamps and configured to display various setting screens and an operational status of the printer 1. The operation unit 75 is provided with buttons and configured to accept various user inputs through the buttons. For example, the operation unit 75 is capable of accepting a user input for a print request or a user input for specifying predetermined print conditions. It is noted that specification of the predetermined print conditions may include selection between color printing and monochrome printing and selection between normal image quality and high image quality ensuring a predetermined level or more. In addition, it is possible to issue a print request or specify a print condition, for example, by an input operation on the external computer 79 via the network interface 69.

The paper jam detecting sensor 76 may include a plurality of sensors disposed on a carrying route of the sheet 5, which detect whether the sheet 5 exists in respective positions thereof. The CPU 61 determines that a paper jam is caused, for example, when receiving no detection signal representing the existence of the sheet 5 from the paper jam detecting sensor 76 at predetermined timing after receiving a print request. The cover opening-closing detecting sensor 78 is adopted to detect whether the front cover 3A is opened or closed and whether the upper cover 3B is opened or closed (hereinafter, the front cover 3A and the upper cover 3B may simply be referred to as a "cover").

(Control Process for Printing and Positional Deviation Correction)

Figure 3:
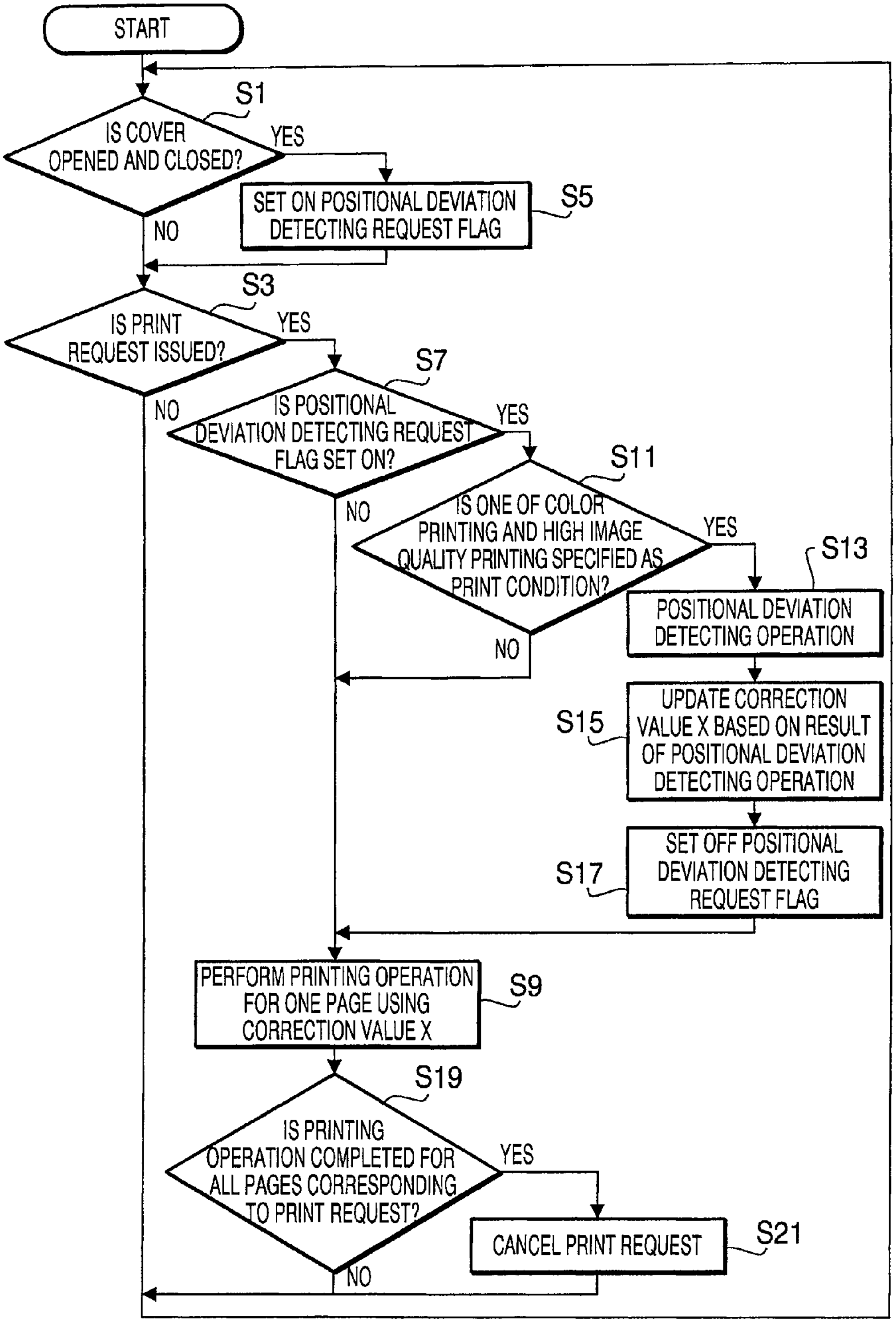
FIG. 3 is a flowchart showing a procedure of a control process for printing and positional deviation correction in the first embodiment according to one or more aspects of the present invention.
Figure 4:
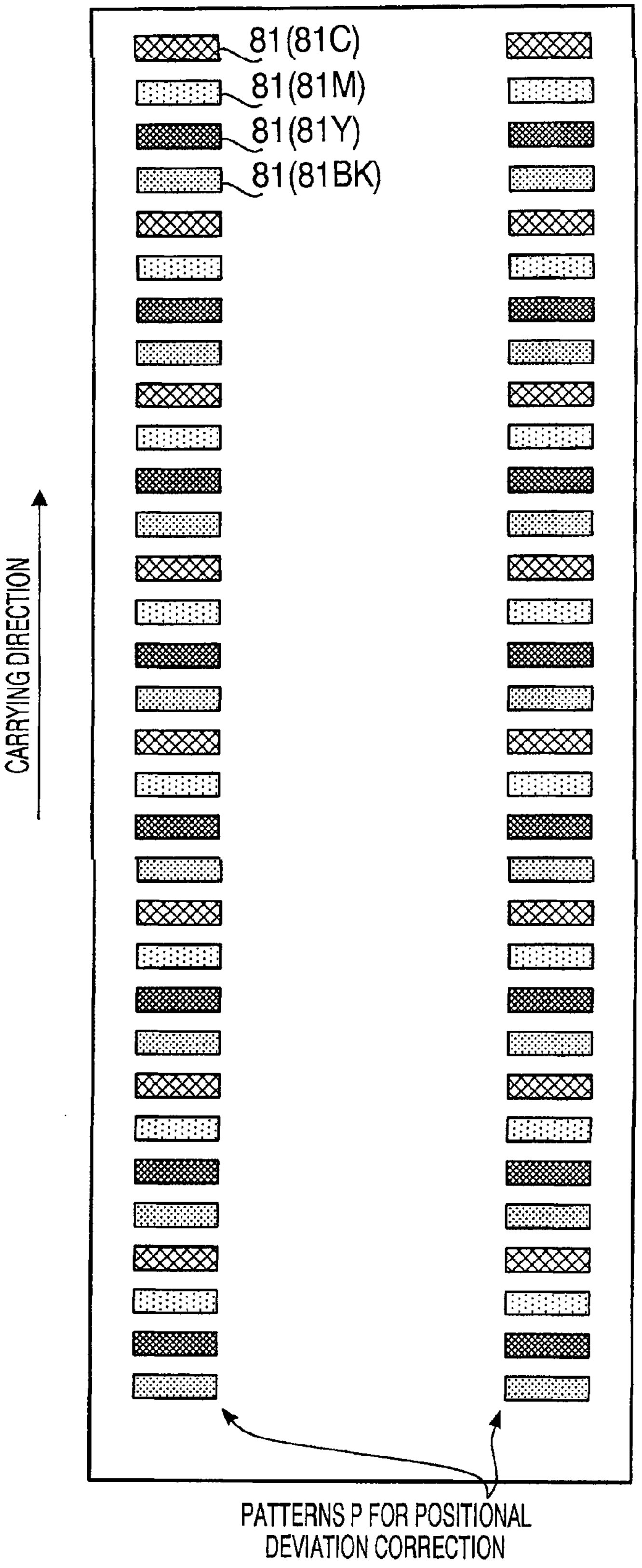
FIG. 4 is a schematic diagram showing a pattern for positional deviation correction in the first embodiment according to one or more aspects of the present invention.

A control process for printing and positional deviation correction to be executed by the CPU 61 will be described. FIG. 3 is a flowchart showing a procedure of the control process for printing and positional deviation correction. FIG. 4 is a schematic diagram showing a pattern for positional deviation correction.

When the printer 1 is powered on, the CPU 61 executes the control process for printing and positional deviation correction as illustrated in FIG. 3. The CPU 61 firstly serves as a control unit. That is to say, when the opening-closing operation of the cover is detected by the cover opening-closing detecting sensor 78 after a previous positional deviation detecting operation as will be mentioned below, the CPU 61 performs a positional deviation detecting operation in response to a print request, and thereafter controls the image forming unit 13 to perform an image forming operation based on the print request.

More specifically, in S1, the CPU 61 monitors whether a cover opening-closing operation is carried out, based on the detection signal from the cover opening-closing detecting sensor. Additionally, in S3, the CPU 61 monitors whether a print request is issued. While no cover opening-closing operation is detected after the previous positional deviation detecting operation (S1: No), the CPU 61 sets a current state to a state where no positional deviation detecting request for a positional deviation detecting operation has been issued (specifically, information representing a positional deviation detecting request flag set OFF is registered, for instance, on the RAM 65). Meanwhile, while a cover opening-closing operation is detected after the previous positional deviation detecting operation (S1: Yes), the present process goes to S5, in which the CPU 61 sets the current state to a state where a positional deviation detecting request for a positional deviation detecting operation has been issued (specifically, information representing the positional deviation detecting request flag set ON is registered, for instance, on the RAM 65). In this regard, however, even in the state where the positional deviation detecting request has been issued, a positional deviation detecting operation is not carried out until a print request is issued.

When a print request is issued (S3: Yes), the present process goes to S7, in which information representing a print request flag set ON is registered on the RAM 65, and it is determined whether it is in the state where the positional deviation detecting request has been issued. Here, when a print request is issued while no cover opening-closing operation is detected after the previous positional deviation detecting operation (S1: No, and S3: Yes), it is determined that it is in the state where no positional deviation detecting request has been issued (S7: No). In this case, without execution of a positional deviation detecting operation, the CPU 61 controls the image forming unit 13 to perform a printing operation for one page by using correction values X currently stored on the RAM 65 (S9).

Meanwhile, when a cover opening-closing operation has already been detected after the previous positional deviation detecting operation, and thereafter a print request is issued (S1: Yes, and S3: Yes), it is determined that it is in the state where a positional deviation detecting request has been issued (S7: Yes). When the predetermined print conditions, for instance, specified via the operation unit 75, comply with a predetermined requirement, a printing operation is performed after execution of a positional deviation detecting operation. Meanwhile, when the print conditions do not comply with the predetermined requirement, a printing operation is performed without execution of a positional deviation detecting operation.

Specifically, it is determined in S11 whether the print conditions comply with the predetermined requirement. It is noted that the predetermined requirement represents that at least one of color printing and high image quality printing is specified as one of the print conditions. When monochrome printing or normal resolution printing is specified as one of the print conditions (S11: No), without execution of a positional deviation detecting operation, the CPU 61 controls the image forming unit 13 to perform a printing operation for one page by using the correction values X currently stored on the RAM 65 (S9).

Meanwhile, when one of color printing and high image quality printing is specified as one of the print conditions (S11: Yes), the present process goes to S13, in which a positional deviation detecting operation is performed to detect deviation amounts of image forming positions based on the positions of marks formed on a carrying body by the image forming unit 13. Specifically, the CPU 61 controls the image forming unit 13 to form a pattern P for positional deviation correction on the belt 25. It is noted that the pattern P may be formed not on the belt 25 but on the sheet 5 fed from the sheet feed tray 7.

As illustrated in FIG. 4, the pattern P for positional deviation correction includes a plurality of marks 81 aligned in a row at each of both sides on the belt 25. It is noted that the aforementioned pair of pattern detecting sensors 26 is disposed such that each of the sensors 26 faces the marks 81 at each side on the belt 25. The marks 81 at each side on the belt 25 are disposed at intervals of a predetermined distance in a carrying direction of the sheet 5. A set of four marks 81 formed with respective four colors used by the process unit 19 is repeatedly provided to form the pattern P containing a plurality of sets of four marks 81. It is noted that the four marks 81 of each set are arranged in a predetermined order (for example, in an order of black 81BK, yellow 81Y, magenta 81M, and cyan 81C).

The CPU 61 measures a positional deviation amount for each color based on the entire pattern P formed on the belt 25. More specifically, the CPU 61 detects a position of each mark 81 by comparing output levels of the pattern detecting sensors 26 with a predetermined threshold.

Subsequently, in S15, positional deviation amounts, with respect to the position of the mark 81BK of black (hereinafter referred to as a standard color), of three marks 81 of the other three colors (hereinafter referred to as correction colors) are determined for each of the aforementioned sets of four marks 81 (more specifically, deviations of the three marks 81 of the correction colors with respect to proper distances thereof from the position of the mark 81BK of the standard color are determined). An average value of the positional deviation amounts determined for all the sets of four marks 81 is calculated for each of the correction colors. Then, the correction value X stored on the RAM 65 is rewritten with the average value as a new correction value for each of the correction colors. Thereafter, in S17, the state where a positional deviation detecting request has been issued is changed to the state where no positional deviation detecting request has been issued. After that, the present process goes to S9.

In S9, the CPU 61 corrects the image forming positions by the image forming unit 13 in accordance with the positional deviation amounts (new correction values X) determined in the positional deviation detecting operation (S13). Specifically, light emitting timing of the aforementioned LED head 18 is adjusted to cancel the positional deviation amount of each of the correction colors with respect to the aforementioned position of the standard color. Thereafter, it is determined in S19 whether the printing operation has been completed for all pages corresponding to the present print request. When the printing operation has not been completed (S19: No), the present process goes back to S1. Meanwhile, when the printing operation has been completed (S19: Yes), the aforementioned print request flag is canceled in S21. After that, the present process goes back to S1, in which the CPU 61 monitors whether a cover opening-closing operation is carried out.

(Effects of First Embodiment)

Effects of the control process for printing and positional deviation correction in the first embodiment will be described in comparison with a comparative example.

(1) In general, when the state of the printer 1, monitored by the CPU 61, satisfies a condition other than the condition that a cover opening-closing operation is performed, the aforementioned positional deviation detecting operation (S13) may be performed. When the aforementioned other condition is satisfied, the positional deviation detecting operation is performed without waiting for a print request. The aforementioned other condition may include a condition that the printer 1 is powered ON, a condition that the printer 1 is left without receiving a print request for a predetermined time period, and a condition that the number of pages printed after a previous correction reaches a predetermined number.

A. Comparative Example

It is supposed that the printer 1 is configured to execute a positional deviation detecting operation, without waiting for a print request to be issued, immediately after the cover is opened and closed as well as when the above other condition is satisfied. In this case, a time chart of operations to be executed by the printer 1 is, for instance, as shown in FIG. 5. Specifically, each time the cover is opened and closed as indicated by (1) and (4) in FIG. 5, a positional deviation detecting operation (see (3) and (6) in FIG. 5) is performed. Especially, as illustrated in FIG. 5, when the cover opening-closing operations are repeatedly performed (see (1) and (4) in FIG. 5) and a print request is issued (see (7) in FIG. 5) within a relatively short time period, a positional deviation detecting operation is wastefully executed. It results in hastening deterioration of components of the printer 1 and consumption of the toner.

Further, the cover opening-closing operation is performed for replacing the development cartridge 33 and/or fixing a paper jam. Therefore, the cover opening-closing operation is likely to be repeated more frequently than the above other condition. In the meantime, the printer 1 is configured with each of the LED heads 18 being suspended from the upper cover 3B via the arm 16. Hence, the image forming positions are likely to be shifted from their respective proper positions, especially by opening and closing the upper cover 3B. Accordingly, it is undesirable to execute no positional deviation detecting operation after the cover is opened and closed, even for the reason that the cover opening-closing operation is frequently performed.

B. First Embodiment

In the first embodiment, as mentioned above, the printer 1 is configured to execute a positional deviation detecting operation (S13) in response to a print request being issued (S3: Yes) after the cover is opened and closed (S1: Yes). Namely, the printer 1 of the first embodiment is configured unlike the printer 1 of the comparative example configured to execute a positional deviation detecting operation when the above other condition is satisfied.

For instance, as illustrated in FIG. 6, even though the cover opening-closing operation is repeatedly performed (see (1) and (4) in FIG. 6), at that time, the CPU 61 only sets the current state to the state where a positional deviation detecting request has been issued (S5), but does not perform any positional deviation detecting operation (see (2) and (5) in FIG. 6). Then, when a request for color printing is issued (S11: Yes, see (7) in FIG. 6), the CPU 61 first performs a positional deviation detecting operation (see (6) in FIG. 6). After that, a printing operation (see (8) in FIG. 6) is carried out. Thus, it is possible to prevent an unnecessary positional deviation correction from being executed, for example, when the cover opening-closing operation is repeated with no print request issued.

(2) In addition, when a request for monochrome printing is issued in the state where the positional deviation detecting request has been issued (S7: Yes, and S11: No), as shown in FIG. 7, in response to each request for monochrome printing being issued (see (3), (5), and (9) in FIG. 7), monochrome printing is performed without execution of a positional deviation detecting operation (see (4), (6), and (10) in FIG. 7). Then, when a request for color printing is issued (see (11) in FIG. 7), a color printing operation is carried out after execution of a positional deviation detecting operation (see (12) and (13) in FIG. 7).

Thus, when a predetermined condition (e.g., color printing, high image quality printing, or printing of a predetermined number of pages or more pages) is specified as one of the print conditions (for example, when such a condition as to require print quality is specified), a printing operation is performed after execution of a positional deviation detecting operation. Therefore, it is possible to ensure print quality. Further, when the predetermined condition is not specified (for example, when high print quality is not required), a printing operation is carried out without execution of a positional deviation detecting operation. Therefore, it is possible to shorten a user waiting time period. Additionally, it is possible to restrain deterioration of components and consumption of coloring agent.

<Second Embodiment>

FIG. 8 is a flowchart showing a procedure of a control process for printing and positional deviation correction in a second embodiment according to aspects of the present invention. FIG. 9 is a time chart showing a time relationship among events such as cover opening-closing operations, a positional deviation detecting operation, and print requests in the second embodiment. The second embodiment is different from the first embodiment in part of the control process for printing and positional deviation correction. The other parts of the second embodiment are the same as those of the first embodiment. Accordingly, the same elements (steps) between the first and second embodiments will be given the same reference characters, and explanation thereon will be omitted. Hereinafter, only differences between the first and second embodiments will be described.

When a paper jam is once caused, for example, for a reason that a jammed sheet is completely removed, thereafter, a paper jam may be caused repeatedly in response to each print request. In view of the above problem, the printer 1 of the first embodiment is configured to, when a paper jam is repeatedly caused predetermined times or more after a cover opening-closing operation, even though a print request is issued, prohibit a positional deviation detecting operation and perform a printing operation, and thereafter to allow the positional deviation detecting operation in the case where the printing operation has normally been completed.

Specifically, when detecting a cover opening-closing operation (S1: Yes), the CPU 61 determines in S31 whether the cover opening-closing operation has been performed in a paper jam state. The determination in S31 is made, for example, based on whether information representing a paper jam flag set ON is registered on the RAM 65. When the cover has been opened and closed in a non-paper-jam state, for instance, in order to replace the development cartridge 33 (S31: No), the CPU 61 sets the current state to the state where the positional deviation detecting request has been issued.

Meanwhile, when the cover has been opened and closed in a paper jam state (S31: Yes), the paper jam state is once canceled (information representing the paper jam flag set OFF is registered on the RAM 65). Subsequently, it is determined in S35 whether a predetermined number of consecutive paper jams have been caused without a printing operation being normally performed after the cover opening-closing operation. The determination in S35 is made based on whether a below-mentioned paper jam counter indicates the predetermined number of times (e.g., two times). When the paper jam counter indicates a number less than the predetermined number of times (S35: No), the CPU 61 sets the current state to the state where the positional deviation detecting request has been issued in S5, and then advances the present process to S3. Meanwhile, when the paper jam counter indicates the predetermined number of times or more (S35: Yes), the present process goes to S3 remaining in the state where the positional deviation detecting request has not been issued.

Even though a print request is issued (S3: Yes), when it is still in the paper jam state (the paper jam is not fixed) (S37: Yes), as it is impossible to perform a printing operation, the present process goes back to S1. Meanwhile, when the paper jam is fixed (S37: No), the present process advances to S7.

The CPU 61 detects whether a paper jam is caused in execution of printing in S9. Specifically, the CPU 61 monitors a detection signal outputted by the paper jam detecting sensor 76, and determines based on the detection signal whether a paper jam is caused. When a paper jam is not caused in execution of printing (S39: No), the CPU 61 determines that the printing operation for one page has normally been completed, and initializes the paper jam counter to "0." Thereafter, the present process goes to S19. Meanwhile, when a paper jam is caused in execution of printing (S39: Yes), the information representing the paper jam flag set ON is registered on the RAM 65 in S43, and the paper jam counter is incremented by one in S45.

According to the aforementioned control process for printing and positional deviation correction, a time relationship among events such as cover opening-closing operation, a positional deviation detecting operation, and print requests is exemplified as illustrated in FIG. 9. For example, when a paper jam (see (2) in FIG. 9) is caused in execution of printing a page (see (1) in FIG. 9) (S39: Yes), the CPU 61 sets the paper jam flag ON to register the information representing that it is currently in the paper jam state (S43), and increments the paper jam counter by one (S45).

After that, when the cover is opened and closed (see (3) in FIG. 9) to fix the paper jam (S1: Yes), the paper jam state is once canceled (S33). At this time, since the paper jam counter still indicates "1" (S35: No), the CPU 61 sets ON the positional deviation detecting request flag (S5). Namely, when a print request (see (5) in FIG. 9) is next issued (S3: Yes), as far as the print conditions comply with the predetermined requirement (S11: Yes), a positional deviation detecting operation (see (6) in FIG. 9) is performed (S13 to S15).

After that, when a paper jam (see (8) in FIG. 9) is again caused in execution of a printing operation in S9 (see (7) in FIG. 9), the cover is opened and closed (see (9) in FIG. 9) to fix the paper jam (S1: Yes). Since at this time, the paper jam counter already indicates "2" (S35: Yes), the state where no positional deviation detecting request has been issued is maintained. Namely, even though a print request (see (10) in FIG. 9) is next issued (S7: Yes), regardless of whether the print conditions comply with the predetermined requirement, a printing operation in S9 (see (11) in FIG. 9) is performed without execution of a positional deviation detecting operation. Accordingly, after that, even though the cover is opened and closed, as far as a paper jam is caused in a printing operation (as far as the printing operation is not normally completed), a positional deviation detecting operation is not performed.

Meanwhile, when a printing operation (see (16) in FIG. 9) is successfully completed with no paper jam caused (S39: No), the paper jam counter is initialized to "0" (S41). Accordingly, after that, when a paper jam is again caused, and the cover is opened and closed (S1: Yes, and S31: Yes), the information representing the positional deviation detecting request flag set ON is again registered on the RAM 65.

According to the aforementioned configuration in the second embodiment, when a paper jam is frequently caused, it is possible to prevent a positional deviation detecting operation from being wastefully repeated in response to a reprint request after a cover opening-closing operation.

<Third Embodiment>

FIG. 10 is a flowchart showing part of a procedure of a control process for printing and positional deviation correction in a third embodiment according to aspects of the present invention. FIG. 11 is a time chart showing a time relationship among events such as cover opening-closing operations, a positional deviation detecting operation, and print requests in the third embodiment. The control process for printing and positional deviation correction in the third embodiment is different from that of the second embodiment in the steps between (A) and (B) surrounded by a dashed line in FIG. 8. FIG. 10 illustrates alternative steps for the steps between (A) and (B) surrounded by the dashed line in FIG. 8. The other steps of the control process for printing and positional deviation correction in the third embodiment are the same as those of the second embodiment. Accordingly, the same elements (steps) between the second and third embodiments will be given the same reference characters, and explanation thereon will be omitted. Hereinafter, only differences between the second and third embodiments will be described.

In the third embodiment, when detecting a cover opening-closing operation after detecting the occurrence of paper jam, the CPU 61 attempts a printing operation for a test page with the image forming unit 13, and performs a positional deviation detecting operation after the printing process is normally completed. After that, the CPU 61 performs a recovery operation to reprint pages printed before the positional deviation detecting operation.

Specifically, when a paper jam is not caused in the printing operation in S9 (S39: No), the CPU 61 determines in S51 whether a positional deviation detecting operation (S13) is executed during a period after the last cover opening-closing operation before the printing operation in S9. The determination is made based on whether the paper jam counter indicates the aforementioned number of times. When a positional deviation detecting operation is performed during the period (S5 1: Yes), as the positional detecting process need not be newly performed here, the present process goes to S41. Then, when a next cover opening-closing operation is carried out, the information representing the positional deviation detecting request flag set ON is registered on the RAM 65.

Meanwhile, when a positional deviation detecting operation is not executed during the period (S5 1: No), since the image forming positions may be shifted from proper positions, a positional deviation detecting operation has to be performed as required. In the third embodiment, the CPU 61 determines in S53 whether the print conditions for the printing operation in S9 comply with the predetermined requirement. When the printing operation is one of normal printing and monochrome printing (S53: No), the present process goes to S41.

Meanwhile, when the printing operation is one of color printing and high image quality printing (S53: Yes), in S55, the CPU 61 inquires of the user whether reprinting after the positional deviation detecting operation is needed. Specifically, the CPU 61 displays on the display unit 73 a message for the inquiry. Then, when an instruction of the user is inputted through the operation unit 75 or the external computer 79 (S57: Yes), and the instruction is not for reprinting (S59: No), the present process goes to S41.

Meanwhile, when the instruction is for reprinting (S59: Yes), the same page as printed in S9 is set to an unprinted state (S61), and the information representing the positional deviation detecting request flag set ON is registered on the RAM 65 (S63). Thereafter, when a reprint request is issued (in FIG. 8, S3: Yes), the CPU 61 performs a positional deviation detecting operation (S13 to S17), and thereby it makes it possible to reprint, as a test page, the same page as printed in S9 after correction of the image forming positions.

According to the above control process for printing and positional deviation correction, a time relationship among events such as cover opening-closing operations, a positional deviation detecting operation, and print requests is exemplified as illustrated in FIG. 11. After occurrence of a paper jam (see (12) in FIG. 11), the cover is opened and closed (see (13) in FIG. 11), a reprint request is issued (see (14) in FIG. 11), and a printing operation is performed (see (15) in FIG. 11). When the printing operation is normally completed without a paper jam being caused (S39: No), at this time, the paper jam counter indicates the predetermined number of times (S51: Yes), the printing operation is color printing (S53: Yes), and a reprint request is issued by the user (see (16) in FIG. 11) (S59: Yes), a reprinting operation (see (18) in FIG. 11) is performed for the same page as printed in the printing operation (15) in FIG. 11 after a positional deviation detecting operation (see (17) in FIG. 11).

As described above, a cover opening-closing operation after a paper jam is highly likely to be performed to fix the paper jam. In addition, when a paper jam is caused, even though the cover is opened and the jammed sheet is removed, a paper jam may be continuously caused, for example, for a reason that a scrip of sheet remains inside the printer 1. Therefore, in the third embodiment, by executing the positional deviation detecting operation after normally completing a printing operation for a test page, it is possible to prevent the positional deviation correction from being wastefully performed.

Further, the test page is a page of an image corresponding to the print request and is reprinted after the positional deviation detecting operation. Hence, a specific test page does not have to be provided for determining whether a printing operation has normally been completed without a paper jam being caused. Furthermore, since the page of the image recognized as a test page is reprinted after the positional deviation detecting operation, it is possible to secure image quality of the page as well as other pages.

Additionally, in the third embodiment, the printer 1 is configured to determine whether to perform reprinting based on a user input instruction. Thereby, it is possible to allow the user to select whether to perform reprinting while looking at the image of the test page prior to the positional deviation detecting operation.

<Fourth Embodiment>

FIG. 12 is a flowchart showing a procedure of a control process for printing and positional deviation correction in a fourth embodiment according to aspects of the present invention. FIG. 13 is a time chart showing a time relationship among events such as cover opening-closing operations, a positional deviation detecting operation, and print requests in the fourth embodiment. The fourth embodiment is different from the first embodiment in part of the control process for printing and positional deviation correction. The other parts of the fourth embodiment are the same as those of the first embodiment. Accordingly, the same elements (steps) between the first and fourth embodiments will be given the same reference characters, and explanation thereon will be omitted. Hereinafter, only differences between the first and fourth embodiments will be described.

In the fourth embodiment, when the cover is opened and closed after a paper jam is detected by the paper jam detecting sensor 76, depending on whether the print conditions comply with the predetermined requirement (S11), the CPU 61 switches between controlling the image forming device 13 to perform a printing operation (S9) after execution of a positional deviation detecting operation (S13) and controlling the image forming device 13 to perform a printing operation (S9) without execution of a positional deviation detecting operation (S13). Meanwhile, when a paper jam is not detected, regardless of the print conditions, the printing operation is performed after execution of the positional deviation detecting operation.

Specifically, when a cover opening-closing operation is detected (S1: Yes), the CPU 61 determines in S31 whether the cover opening-closing operation has been performed in a paper jam state. The determination is made, for example, based on whether the information representing the paper jam flag set ON is registered on the RAM 65. When the cover has been opened and closed in a non-paper-jam state, for instance, for replacement of the development cartridge 33 (S31: No), the CPU 61 registers on the RAM 65 information representing that a positional deviation detecting request has been issued without a paper jam being involved.

Meanwhile, when the cover has been opened and closed in a paper jam state (S31: Yes), the paper jam state is once canceled in S33 (information representing that the paper jam flag is set OFF is registered on the RAM 65). Subsequently, the CPU 61 registers on the RAM 65 information representing that a positional deviation detecting request has been issued after cancellation of a paper jam (S73), and then advances the present process to S3.

Even though a print request is issued (S3: Yes), when the paper jam state is not canceled (S37: Yes), as it is impossible to perform a printing operation, the present process goes back to S1. Meanwhile, when the paper jam state has been canceled (S37: No), the present process goes to S75. When a positional deviation detecting request has been issued in a non-paper-jam state (S75: Yes), namely, when the cover opening-closing operation in S1 has been performed for a reason other than a paper jam, regardless of whether the print conditions comply with the predetermined requirement, the CPU 61 executes a positional deviation detecting operation (S13 to S17), and then advances the present process to S9.

Meanwhile, when a positional deviation detecting request has been issued after cancellation of a paper jam state (S75: No, and S77: Yes), namely, when the cover opening-closing operation in S1 is performed in response to the paper jam, in the case where the print conditions comply with the predetermined requirement (S11: Yes), the CPU 61 executes a positional deviation detecting operation (S13 to S17). Meanwhile, in the case where the print conditions do not comply with the predetermined requirement (S11: No), the present process goes to S9 without executing a positional deviation detecting operation.

In addition, the CPU 61 monitors a detection signal outputted from the paper jam detecting sensor 76 in execution of the printing operation in S9, and determines based on the detection signal whether a paper jam is caused. When a paper jam is not caused in execution of the printing operation (S39: No), the present process goes to S19. Meanwhile, when a paper jam is caused in execution of the printing operation (S39: Yes), the information representing the paper jam flag set ON is registered on the RAM 65 in S43, and the present process goes back to S1.

According to the above control process for printing and positional deviation correction, a time relationship among events such as such as cover opening-closing operations, a positional deviation detecting operation, and print requests is exemplified as illustrated in FIG. 13. When the cover is opened and closed (see (1) in FIG. 13) in a non-paper-jam state, the information representing that the positional deviation detecting request has been issued in the non-paper-jam state is registered on the RAM 65 (S71) (see (2) in FIG. 13). Therefore, when a print request is issued (see (3) in FIG. 13) (S3: Yes, and S75: Yes), regardless of the print conditions, a printing operation is performed (see (5) in FIG. 13) after execution of a positional deviation detecting operation (see (4) in FIG. 13).

Meanwhile, when the cover is opened and closed (see (7) in FIG. 13) after occurrence of a paper jam (see (6) in FIG. 13), the information representing that a positional deviation detecting request has been issued after cancellation of the paper jam state is registered on the RAM 65 (S73) (see (8) in FIG. 13). Therefore, when a monochrome print request is issued (see (9) in FIG. 13) (S3: Yes, and S77: Yes), since the print conditions do not comply with the predetermined requirement (S11: No), a monochrome printing operation is performed (see (10) in FIG. 13) without executing a positional deviation detecting operation.

Meanwhile, when a color print request is issued (see (11) in FIG. 13) (S3: Yes, and S77: Yes), since the print conditions comply with the predetermined requirement (S11: Yes), a color printing operation is performed (see (13) in FIG. 13) after execution of a positional deviation detecting operation (see (12) in FIG. 13).

As described above, when a printing operation is performed after occurrence of a paper jam, another paper jam may be likely to be caused more highly than usual. Therefore, when the printer 1 is adopted to always execute a positional deviation detecting operation prior to a printing operation, the positional deviation detecting operation is wastefully repeated in the case where a paper jam is repeatedly caused. In consideration of the above problem, according to the fourth embodiment, when a paper jam is caused, a positional deviation detecting operation is executed only in the case where the print conditions comply with the predetermined requirement. Thereby, it is possible to prevent the positional deviation detecting operation from being wastefully performed.

<Fifth Embodiment>

FIGS. 14 and 15 are flowcharts showing a procedure of a control process for printing and positional deviation correction in a fifth embodiment according to aspects of the present invention. The fifth embodiment is different from the first embodiment in part of the control process for printing and positional deviation correction. The other parts of the fifth embodiment are the same as those of the first embodiment. Accordingly, the same elements (steps) between the first and fifth embodiments will be given the same reference characters, and explanation thereon will be omitted. Hereinafter, only differences between the first and fifth embodiments will be described.

In the fifth embodiment, when a frequency of occurrences of paper jams detected by the paper jam detecting sensor 76 is equal to or more than a standard value (e.g., five times), and the cover is opened and closed, depending on whether the print conditions comply with the predetermined requirement, the CPU 61 switches between controlling the image forming unit 13 to perform a printing operation after execution of a positional deviation detecting operation and controlling the image forming unit 13 to perform a printing operation without execution of a positional deviation detecting operation. Meanwhile, when the frequency of occurrences of paperjams is less than the standard value, regardless of the print conditions, a printing operation is performed after execution of the positional deviation detecting operation.

Specifically, the CPU 61 counts the number of occurrences of paper jams (hereinafter referred to as "paper jam occurrence frequency") in the latest printing operations for a predetermined number of pages. The CPU 61 monitors a detection signal from the paper jam detecting sensor 76 in a printing operation in S9, and determines based on the detection signal whether a paper jam is caused. When a paper jam is caused in the printing operation (S39: Yes), the information representing the paper jam flag set ON is registered on the RAM 65 in S43. Then, the paper jam counter is incremented by one in S45.

Meanwhile, when a paper jam is not caused in the printing operation (S39: No), a print counter is incremented by one in S9 1. Then, in S93, the CPU 61 determines whether the latest printing operations for a predetermined number of pages or a predetermined number of sheets have normally been completed. The determination is made based on whether the print counter exceeds a predetermined number (e.g., 10). When the latest printing operations for the predetermined number of pages have normally been completed (S93: Yes), the print counter is initialized to "0" (S95), the paper jam counter is initialized to "0" (S41), and thereafter the present process goes to S19. Meanwhile, when the latest printing operations for the predetermined number of pages have not yet been completed (S93: No), the present process goes to S19 without initializing the print counter.

In addition, when detecting a cover opening-closing operation (S1: Yes), the CPU 61 determines in S31 whether the cover opening-closing operation has been performed in a paper jam state. When the cover has been opened and closed in a non-paper-jam state, for instance, in order to replace the development cartridge 33 (S31: No), the present process goes to S81. Meanwhile, when the cover has been opened and closed in a paper jam state (S31: Yes), the CPU 61 once cancels the paper jam state in S33 and advances the present process to S81. In S81, the CPU 61 determines whether the paper jam occurrence frequency is high. Specifically, when the paper jam occurrence frequency is equal to or more than a standard value (e.g., 5) (S81: Yes), in S83, the CPU 61 sets the current state to a state where a positional deviation detecting request has been issued in the case of high paper jam occurrence frequency. Meanwhile, when the paper jam occurrence frequency is less than the standard value (S81: No), in S83, the CPU 61 sets the current state to a state where a positional deviation detecting request has been issued in the case of low paper jam occurrence frequency.

Thereby, in the case where a print request is issued (S3: Yes), when the frequency of occurrences of paper jams in the latest printing operations for the predetermined number of pages is less than the standard value (S87: Yes), regardless of the print conditions, a printing operation is performed (S9) after execution of the positional deviation detecting operation (S13 to S17).

Meanwhile, in the case where a print request is issued (S3: Yes), when the frequency of occurrences of paper jams in the latest printing operations for the predetermined number of pages is equal to or more than the standard value (S89: Yes), in response to the print conditions complying with the predetermined requirement (S11: Yes), a printing operation is performed after execution of the positional deviation detecting operation. On the other hand, when the print conditions do not comply with the predetermined requirement (S11: No), a printing operation is performed without execution of a positional deviation detecting operation.

As described above, when a printing operation is performed after occurrence of a paper jam, another paper jam may be likely to be caused more highly than usual. Therefore, when the printer 1 is adopted to always execute a positional deviation detecting operation prior to a printing operation, the positional deviation detecting operation is wastefully repeated in the case where a paper jam is repeatedly caused. Hence, in the case of high frequency of occurrences of paper jams, by performing the positional deviation detecting operation only in response to a predetermined condition being satisfied, it is possible to prevent the positional deviation detecting operation from being wastefully executed.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. For example, the present invention is capable of the following modifications.

<Modifications>

The aforementioned embodiments have been described with the predetermined requirements exemplified, such as whether a printing operation is color printing and whether a printing operation is high image quality printing. However, the printer 1 may be adopted to allow the user to determine, for instance, through the operation unit 75 or the external computer 79, whether the positional deviation detecting operation is performed in response to the cover being closed, or in response to a print request being issued after the cover is closed. It may be preferred that a positional deviation detecting operation is performed immediately after the cover is closed. In such a case, it is desired that the printer 1 is configured such that the user can select timing to execute a positional deviation detecting operation as needed.

The printer 1 may include an electrophotographic type printer provided with a laser scanning device having a polygon mirror, and an inkjet printer.

In the aforementioned embodiments, the printer 1 is adopted not to execute a positional deviation detecting operation when monochrome printing or normal printing is specified. However, the printer 1 may be configured to execute a positional deviation detecting operation even when monochrome printing or normal printing is specified. For example, in the case of printing on a ledger sheet such as a transmittal form, it is required to accurately print characters in each section on the ledger sheet. In this case, a printing operation is desired to be performed after execution of a positional deviation detecting operation.

What is claimed is:

1. An image forming device, comprising:

a main body casing;

a cover configured to be openable and closable with respect to the main body casing;

a sensing unit configured to sense an opening-closing operation of the cover;

a forming unit configured to form an image on a sheet;

an accepting unit configured to accept a print request;

a specifying unit configured to specify a print condition;

a determining unit configured to determine whether the print condition specified by the specifying unit complies with a predetermined requirement;

a detecting unit configured to perform a detecting operation to detect a deviation of an image forming position of the image to be formed by the forming unit; and a control device configured, in response to the print request being accepted through the accepting unit after the sensing unit senses an opening-closing operation of the cover after execution of a previous detecting operation, to:

control the detecting unit to perform the detecting operation; and thereafter control the forming unit to perform a printing operation to form the image in the image forming position corrected to cancel the deviation detected in the detecting operation either after execution of the detecting operation when the determining unit determines that the print condition complies with the predetermined requirement, or without execution of the detecting operation when the determining unit determines that the print condition does not comply with the predetermined requirement.

2. The image forming device according to claim 1, wherein the forming unit is configured to form an image with a plurality of coloring agents of respective different colors, wherein the determining unit is configured to determine whether the print condition complies with a requirement for image forming with the plurality of coloring agents, wherein the control unit is configured to control the forming unit to perform the printing operation after execution of the detecting operation when the determining unit determines that the print condition complies with the requirement for image forming with the plurality of coloring agents, and wherein the control unit is configured to control the forming unit to perform the printing operation without execution of the detecting operation when the determining unit determines that the print condition complies with a requirement for image forming with a single coloring agent.

3. The image forming device according to claim 1, further comprising a paper jam detecting unit configured to detect a paper jam, wherein the control unit is configured to switch between controlling the forming unit to perform the printing operation after execution of the detecting operation and controlling the forming unit to perform the printing operation without execution of the detecting operation, depending on the determination made by the determining unit, when the sensing unit senses the opening-closing operation of the cover after the paper jam detecting unit detects a paper jam, and wherein the control unit is configured to control the forming unit to perform the printing operation after execution of the detecting operation, regardless of the determination made by the determining unit, when the paper jam detecting unit does not detect a paper jam.

4. The image forming device according to claim 3, wherein the control unit is configured to control the detecting unit to perform the detecting operation after completing a printing operation for a test page with the forming unit when the sensing unit senses the opening-closing operation of the cover after the paper jam detecting unit detects the paper jam.

5. The image forming device according to claim 3, wherein the control unit is configured to, when the paper jam detecting unit detects a predetermined number of consecutive paper jams in execution of the printing operation after the detecting operation, control the forming unit to perform the printing operation without execution of a subsequent detecting operation.

6. The image forming device according to claim 1, further comprising a paper jam detecting unit configured to detect a paper jam, wherein the control unit is configured to switch between controlling the forming unit to perform the printing operation after execution of the detecting operation and controlling the forming unit to perform the printing operation without execution of the detecting operation, depending on the determination made by the determining unit, when a frequency of occurrences of paper jams detected by the paper jam detecting unit is equal to or more than a predetermined value, and the sensing unit senses the opening-closing operation of the cover, and wherein the control unit is configured to control the forming unit to perform the printing operation after execution of the detecting operation, regardless of the determination made by the determining unit, when the frequency of occurrences of paper jams detected is less than the predetermined value.

7. The image forming device according to claim 6, wherein the control unit is configured to control the detecting unit to perform the detecting operation after completing a printing operation for a test page with the forming unit when the sensing unit senses the opening-closing operation of the cover after the paper jam detecting unit detects the paper jam.

8. The image forming device according to claim 6, wherein the control unit is configured to, when the paper jam detecting unit detects a predetermined number of consecutive paper jams in execution of the printing operation after the detecting operation, control the forming unit to perform the printing operation without execution of a subsequent detecting operation.

9. The image forming device according to claim 1, further comprising a paper jam detecting unit configured to detect a paper jam, wherein the control unit is configured to control the detecting unit to perform the detecting operation after completing a printing operation for a test page with the forming unit when the sensing unit senses the opening-closing operation of the cover after the paper jam detecting unit detects a paper jam.

10. The image forming device according to claim 9, wherein the test page is a page of the image to be formed in response to the print request, and wherein the control unit is configured to control the forming unit to perform a reprinting operation for the test page after execution of the detecting operation.

11. The image forming device according to claim 10, further comprising a selecting unit configured to accept a selection of whether to perform the reprinting operation for the test page after execution of the detecting operation.

12. The image forming device according to claim 9, wherein the control unit is configured to, when the paper jam detecting unit detects a predetermined number of consecutive paper jams in execution of the printing operation after the detecting operation, control the forming unit to perform the printing operation without execution of a subsequent detecting operation.

13. The image forming device according to claim 1, further comprising a paper jam detecting unit configured to detect a paper jam, wherein the control unit is configured to, when the paper jam detecting unit detects a predetermined number of consecutive paper jams in execution of the printing operation after the detecting operation, control the forming unit to perform the printing operation without execution of a subsequent detecting operation.

14. The image forming device according to claim 1, further comprising a selecting unit configured to accept a selection of whether to perform the detecting operation in response to the opening-closing operation of the cover being detected or in response to the print request being accepted after the detection of the opening-closing operation of the cover.

15. The image forming device according to claim 1, wherein at least part of the forming unit is supported by the cover.

16. The image forming device according to claim 1, further comprising a carrying body configured to carry a sheet thereon, wherein the forming unit is configured to form marks on the carrying body, and wherein the detecting unit is configured to perform the detecting operation, based on positions of the marks formed on the carrying body by the forming unit.

17. The image forming device according to claim 4, wherein the test page is a page of the image to be formed in response to the print request, and wherein the control unit is configured to control the forming unit to perform a reprinting operation for the test page after execution of the detecting operation.

18. The image forming device according to claim 17, further comprising a selecting unit configured to accept a selection of whether to perform the reprinting operation for the test page after execution of the detecting operation.

19. The image forming device according to claim 7, wherein the test page is a page of the image to be formed in response to the print request, and wherein the control unit is configured to control the forming unit to perform a reprinting operation for the test page after execution of the detecting operation.

20. The image forming device according to claim 19, further comprising a selecting unit configured to accept a selection of whether to perform the reprinting operation for the test page after execution of the detecting operation.

21. A method for forming an image on a sheet with an image forming device, the image forming device comprising a main body casing and a cover configured to be openable and closable with respect to the main body casing, the method comprising the steps of:

determining whether the cover is opened and closed;

accepting a print request;

performing, in response to the print request being accepted and the determination that the cover is opened and closed after execution of a previous detecting operation, a detecting operation to detect a deviation of an image forming position of the image to be formed by the image forming device, determining whether a print condition complies with a predetermined requirement, and forming the image in the image forming position corrected to cancel the deviation of the image forming position detected in the detecting operation either after execution of the detecting operation when the determining step determines that the print condition complies with the predetermined requirement, or without execution of the detecting operation when the determining step determines that the print condition does not comply with the predetermined requirement.

22. A non-transitory computer readable medium having computer readable instructions stored thereon that, when executed by a computer, cause an image forming device comprising a main body casing and a cover configured to be openable and closable with respect to the main body casing, to perform the steps of:

determining whether the cover is opened and closed;

accepting a print request;

performing, in response to the print request being accepted and the determination that the cover is opened and closed after execution of a previous detecting operation, a detecting operation to detect a deviation of an image forming position of an image to be formed by the image forming device, determining whether a print condition complies with a predetermined requirement, and forming the image in the image forming position corrected to cancel the deviation of the image forming position detected in the detecting operation either after execution of the detecting operation when the determining step determines that the print condition complies with the predetermined requirement, or without execution of the detecting operation when the determining step determines that the print condition does not comply with the predetermined requirement.

* * * * *